United States Patent [19]

Yamato et al.

[11] Patent Number: 4,531,495
[45] Date of Patent: Jul. 30, 1985

[54] FUEL SUPPLY CONTROL METHOD HAVING FAIL-SAFE FUNCTION FOR ABNORMALITIES IN ENGINE TEMPERATURE DETECTING MEANS AT THE START OF THE ENGINE

[75] Inventors: Akihiro Yamato; Yutaka Otobe, both of Shiki, Japan

[73] Assignee: Honda Giken Kogyo Kabushiki Kaisha, Tokyo, Japan

[21] Appl. No.: 493,978

[22] Filed: May 12, 1983

[30] Foreign Application Priority Data

May 20, 1982 [JP] Japan .................................. 57-85316

[51] Int. Cl.³ ............................................. F02D 5/00
[52] U.S. Cl. ..................................... 123/479; 123/491
[58] Field of Search ............... 123/179 G, 179 L, 479, 123/491

[56] References Cited

U.S. PATENT DOCUMENTS 4,274,381 6/1981 Abo ..................................... 123/479
4,450,812 5/1984 Otsuka et al. ....................... 123/479

FOREIGN PATENT DOCUMENTS

0141926 11/1979 Japan .................................. 123/479
0062944 4/1982 Japan .................................. 123/479

Primary Examiner—Parshotam S. Lall
Assistant Examiner—W. R. Wolfe
Attorney, Agent, or Firm—Lyon & Lyon

[57] ABSTRACT

A fuel supply control method for electronically controlling the quantity of fuel being supplied to an internal combustion engine at the start of the engine, in response to values of engine control parameters including at least the engine temperature. When there is an abnormality in an engine temperature detecting means that detects the value of the engine temperature, while the engine is operating in a predetermined starting operating condition, control is effected by gradually increasing the quantity of fuel being supplied to the engine with the progress of time starting from a time the engine starter is switched on, by the use of a predetermined dummy signal indicative of engine temperature, in place of an output signal from the aforementioned engine temperature detecting means. Preferably, the value of the above dummy signal is set so as to change from a higher engine temperature value to lower engine temperature values in a successive and stepwise manner at an interval of a predetermined period of time. Also, the value of the above dummy signal is maintained at a predetermined value in the post-starting operating condition of the engine.

15 Claims, 11 Drawing Figures

FUEL SUPPLY CONTROL METHOD HAVING FAIL-SAFE FUNCTION FOR ABNORMALITIES IN ENGINE TEMPERATURE DETECTING MEANS AT THE START OF THE ENGINE

BACKGROUND OF THE INVENTION

This invention relates to a fuel supply control method for internal combustion engines, and more particularly to a method of this kind which is adapted to control the quantity of fuel being supplied to the engine at the start of the engine to ensure smooth starting of the engine when an abnormality or failure occurs in the engine temperature detecting means.

A fuel supply control system adapted for use with an internal combustion engine, particularly a gasoline engine has been proposed e.g. by U.S. Pat. No. 3,483,851, which is adapted to determine the valve opening period of a fuel quantity metering or adjusting means for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

According to this proposed system, as the quantity of fuel being supplied to the engine at the start of the engine is determined to a very large extent in dependence upon the engine temperature (e.g. engine cooling water temperature), the value of an engine cooling water temperature-dependent coefficient is set such that the lower the engine cooling water temperature, the larger the quantity of fuel being supplied to the engine is set to, so as to obtain smooth starting of the engine. However, if an abnormality occurs in the function of the sensor means for detecting engine cooling water temperature, the value of the engine cooling water temperature-dependent coefficient is not set to a proper value so that it becomes very difficult to achieve smooth starting of the engine as the quantity of fuel supplied to the engine is not adapted to the engine cooling water temperature.

Even when the engine comes into a post-starting operating condition where the cranking rpm of the engine is exceeded to start normal fuel supply control, if the fuel quantity is not corrected by the engine cooling water temperature-dependent correction coefficient in the event of occurrence of an abnormality in the function of the water temperature sensor means, the fuel quantity cannot be controlled to a proper value with accuracy, resulting in stoppage of the engine or degradation in the emission characteristics and driveability of the engine.

SUMMARY OF THE INVENTION

It is an object of the invention to provide a fuel supply control method for an internal combustion engine, which enables smooth starting of the engine even in the event of occurrence of an abnormality in the function of engine temperature detecting means at the start of the engine, by applying a predetermined dummy signal indicative of engine temperature to the fuel supply control.

It is a further object of the invention to provide a fuel supply control method for an internal combustion engine, wherein the value of the above predetermined dummy signal is maintained at a predetermined value even after the starting operation of the engine is completed, in the event of occurrence of an abnormality in the function of engine temperature detecting means at the start of the engine, thereby ensuring smooth operation of the engine as well as preventing heavy degradation in the emission characteristics and driveability of the engine.

According to this invention, a fuel supply control method is provided for electronically controlling the quantity of fuel being supplied to an internal combustion engine having a starter and a means for detecting the temperature of the engine, at the start of the engine in response to the values of engine control parameters including at least the engine temperature detected by the above engine temperature detecting means.

The method according to the invention is characterized by comprising the following steps: detecting an abnormality in the functioning of the engine temperature detecting means; employing a predetermined dummy signal value indicative of engine temperature in place of an engine temperature signal generated by the above engine temperature detecting means, when an abnormality is detected in the functioning of the same detecting means; gradually increasing the quantity of fuel being supplied to the engine with the lapse of time starting from a time the starter is switched on, by the use of the value of the aforementioned dummy signal value, when an abnormality is detected in the functioning of the engine temperature detecting means while the engine is operating in a predetermined starting condition.

Preferably, the value of the above dummy signal is set so as to change, preferably successively, preferably in a stepwise manner, from a higher temperature value to lower temperature values at an interval of a predetermined period of time, when the engine is in the above predetermined starting condition. Also, the value of this predetermined dummy signal is maintained at a predetermined value in the post-starting operating condition of the engine.

More preferably, when the value of the signal outputted by the engine temperature detecting means continues to remain outside a predetermined range for a predetermined period of time, it is determined that there is an abnormality in the functioning of the above engine temperature detecting means.

The above and other objects, features and advantages of the invention will be more apparent from the ensuing detailed description taken in conjunction with the accompanying drawings.

DETAILED DESCRIPTION

The present invention will now be described in detail with reference to the drawings.

Figure 1:
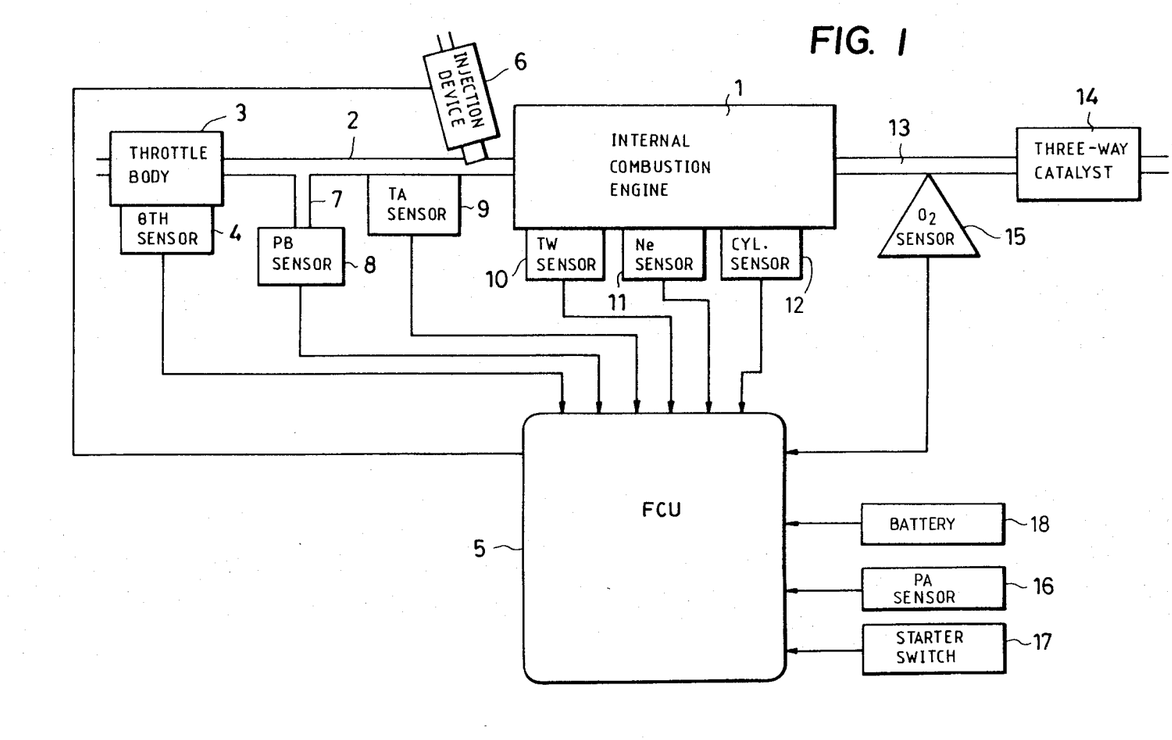
FIG. 1 is a block diagram illustrating the whole arrangement of a fuel supply control system to which is applicable the method according to the present invention.

Referring first to FIG. 1, there is illustrated the whole arrangement of a fuel supply control system for internal combustion engines, to which the method of present invention is applicable. Reference numeral 1 designates an internal combustion engine which may be a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 is a throttle body 3 which accommodates a main throttle valve and a sub throttle valve mounted in the main intake pipe and the sub intake pipe, respectively, for synchronous operation. Neither of the two throttle valves is shown. A throttle valve opening sensor 4 is connected to the main throttle valve for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors and a subinjector, none of which is shown. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The main injectors and the subinjector are electrically connected to the ECU 5 in a manner having their valve opening periods or fuel injection quantities controlled by signals supplied from the ECU 5.

On the other hand, an absolute pressure sensor 8 communicates through a conduit 7 with the interior of the main intake pipe of the throttle body 3 at a location immediately downstream of the main throttle valve. The absolute pressure sensor 8 is adapted to detect absolute pressure in the intake pipe 2 and applies an electrical signal indicative of detected absolute pressure to the ECU 5. An intake-air temperature sensor 9 is arranged in the intake pipe 2 at a location downstream of the absolute pressure sensor 8 and also electrically connected to the ECU 5 for supplying thereto an electrical signal indicative of detected intake-air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., upon generation of each pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An O$_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure, and an engine starter switch 17 and a battery 18, respectively, for supplying the ECU 5 with an electrical signal indicative of the atmospheric pressure, an electrical signal indicative of the battery voltage and an electrical signal indicative of on-off positions of the starter switch 17.

Next, the fuel supply control operation of the fuel supply control system of the invention arranged as above will now be described in detail.

Figure 2:
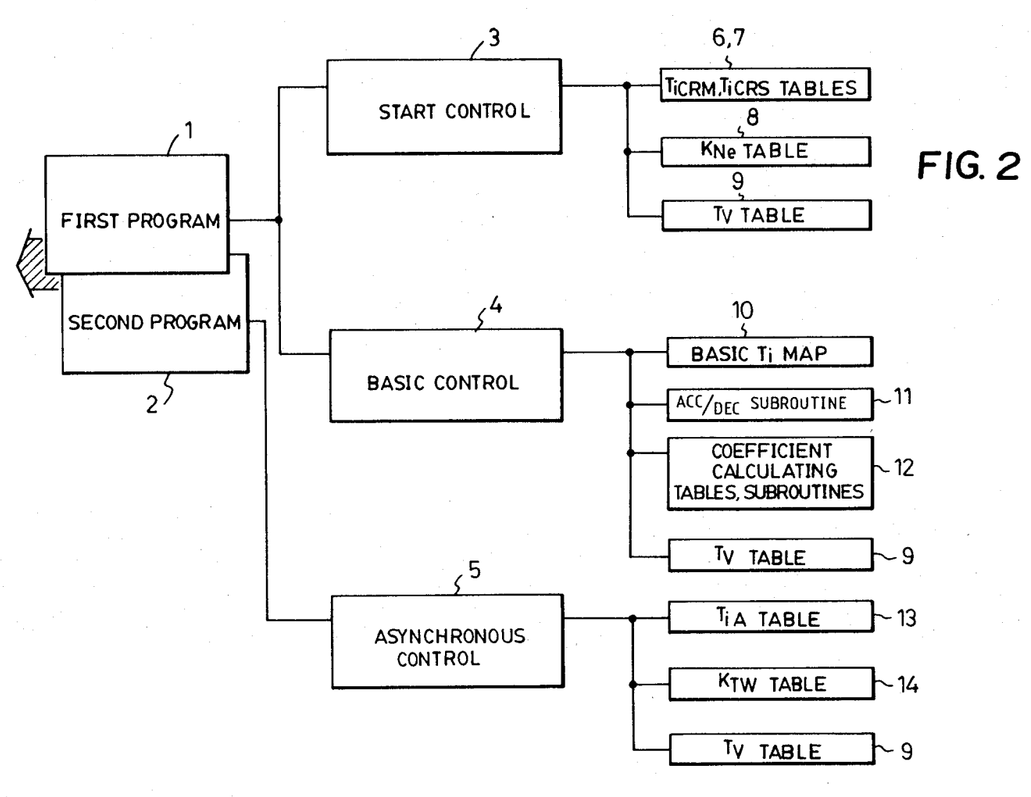
FIG. 2 is a block diagram illustrating a program for control of the valve opening periods TOUTM, TOUTS of the main injectors and the subinjector, which is executed by an electronic control unit (ECU) in FIG. 1.

Referring first to FIG. 2, there is illustrated a block diagram showing the whole program for air/fuel ratio control, i.e. control of valve opening periods TOUTM, TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (1)$$

$$TOUTS = TiCRS \times KNe + TV \quad (2)$$

where TiCRM, TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery, which is determined from a TV table 9. $\Delta$TV is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times \quad (3)$$

$$KAFC \times KPA \times KAST \times KWOT \times KO_2 \times KLS) +$$

$$TACC \times (KTA \times KTWT \times KAFC) + (TC + \Delta TV)$$

$$TOUTS = (TiS - TDEC) \times (KTA \times \quad (4)$$

$$KTW \times KAST \times KPA) + TV$$

where TiM, TiS represent basic values of the valve opening periods for the main injectors and the subinjector, respectively, and are determined from a basic Ti map 10, and TDEC, TACC represent constants applicable, respectively, at engine deceleration and at engine acceleration and are determined by acceleration and deceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, $KO_2$ an "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture.

On the other hand, the valve opening period TMA for the main injectors which is applicable in asynchronism with the TDC signal is determined by the following equation:

$$TMA = TiA \times KTWT \times KAST + (TV + \Delta TV) \quad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 3:
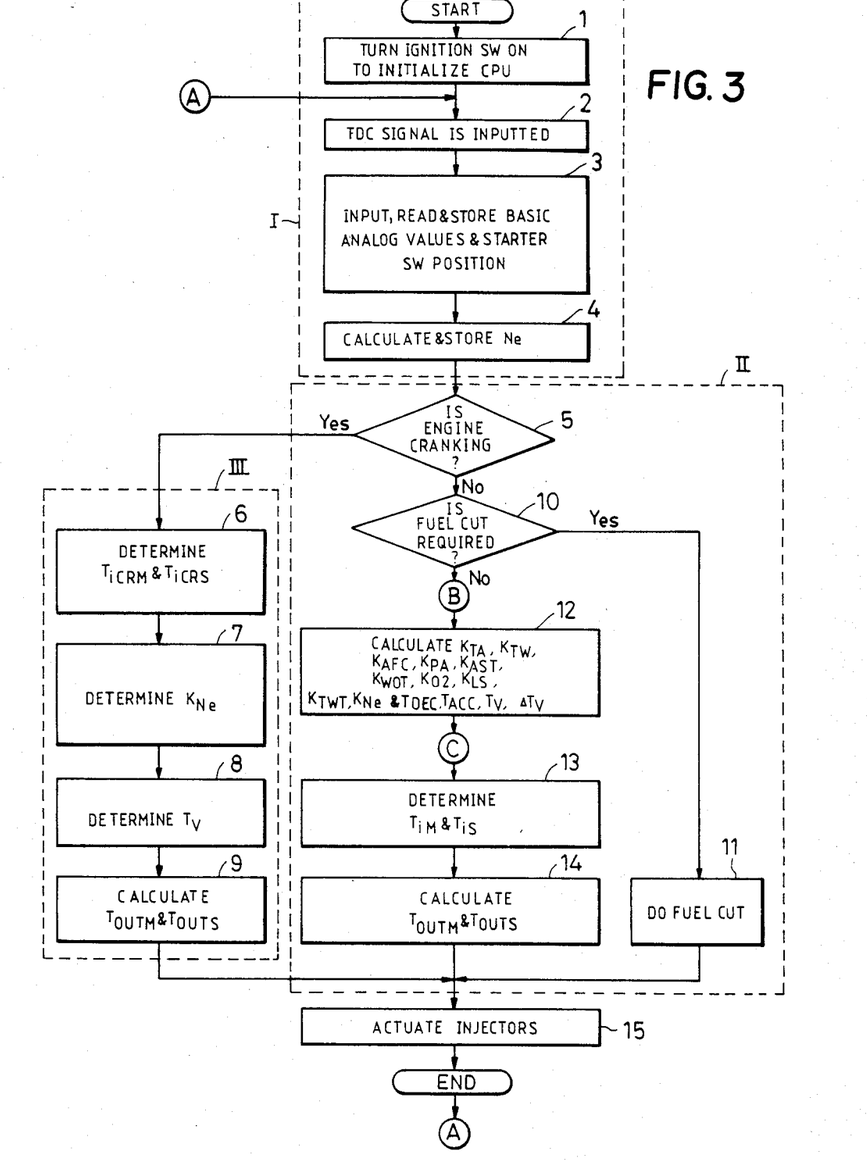
FIG. 3 is a flow chart showing a main program for control of the basic valve opening periods TOUTM, TOUTS.

Referring next to FIG. 3, there is shown a flow chart of the aforementioned first program 1 for control of the valve opening period in synchronism with the TDC signal in the ECU 5. The whole program comprises an input signal processing block I, a basic control block II and a start control block III. First in the input signal processing block I, when the ignition switch not shown of the engine is turned on, CPU in the ECU 5 is initialized at the step 1 and the TDC signal is inputted to the ECU 5 as the engine starts at the step 2. Then, all basic analog values are inputted to the ECU 5, which include detected values of atmospheric pressure PA, absolute pressure PB, engine cooling water temperature TW, intake air temperature TA, throttle valve opening $\theta$TH, battery voltage V, output voltage value V of the $O_2$ sensor and on-off state of the starter switch 17, some necessary ones of which are then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (1), (2) to calculate the values of TOUTM, TOUTS (step 9).

If the answer to the question of the above step 5 is no, it is determined whether or not the engine is in a condition for carrying out fuel cut, at the step 10. If the answer is yes, the values of TOUTM and TOUTS are both set to zero, at the step 11.

On the other hand, if the answer to the question of the step 10 is negative, calculations are carried out of values of correction coefficients KTA, KTW, KAFC, KPA, KAST, KWOT, $KO_2$, KLS, KTWT, etc. and values of correction constants TDEC, TACC, TV and $\Delta$TV, by means of the respective calculation subroutines and tables, at the step 12.

Then, basic valve opening period values TiM and TiS are selected from respective maps of the TiM value and the TiS value, which correspond to data of actual engine rpm Ne and actual absolute pressure PB and/or like parameters, at the step 13.

Then, calculations are carried out of the values TOUTM, TOUTS on the basis of the values of correction coefficients and correction constants selected at the steps 12 and 13, as described above, using the aforementioned equations (3), (4) (the step 14). The main injectors and the subinjector are actuated with valve opening periods corresponding to the values of TOUTM, TOUTS obtained by the aforementioned steps 9, 11 and 14 (the step 15).

Figure 4:
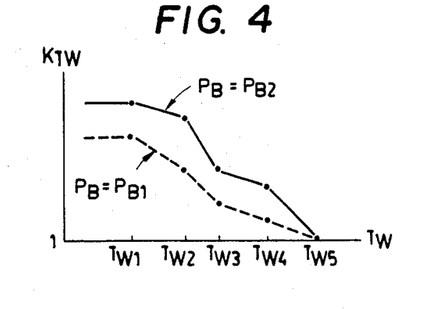
FIG. 4 is a view showing a table of the relationship between engine cooling water temperature TW and water temperature-dependent fuel increasing coefficient KTW.
Figure 5:
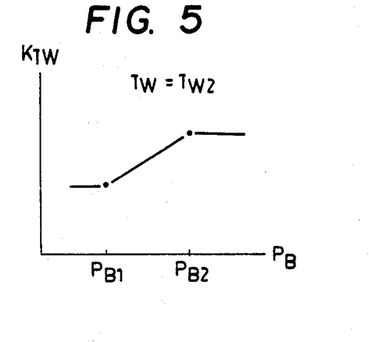
FIG. 5 is a graph showing the relationship between intake passage absolute pressure PB and water temperature-dependent fuel increasing coefficient KTW, based on the assumption that the water temperature TW remains unchanged.

FIG. 4 shows a KTW table plotting the relationship between the engine cooling water temperature TW and the water temperature-dependent fuel increasing coefficient KTW. It is noted from the table that the coefficient KTW has a value of 1 when the water temperature TW is higher than a predetermined value TW5 (e.g. 60° C.), while in the event that the water temperature TW is lower than the above predetermined value TW5, the value of the coefficient KTW is selected from five different values of KTW provided, respectively, for five predetermined values of water temperature TW1-5 which form calibration variables. When the water temperature TW shows a value other than the variables TW1-5, the value of KTW is determined by means of an interpolation method. FIG. 5 is a graph plotting the relationship between the absolute pressure PB and the coefficient KTW, based on the assumption that the water temperature TW remains constant. According to this graph, there are provided two predetermined absolute pressure values PB1 (e.g. 400 mmHg) and PB2 (e.g. 300 mmHg) as examples of the absolute pressure PB. When the absolute pressure PB is lower than PB1 or higher than PB2, the coefficient KTW has a constant value. When the absolute pressure PB lies between the two predetermined values PB1 and PB2, the value of KTW is determined by means of an interpolation method.

Figure 6:
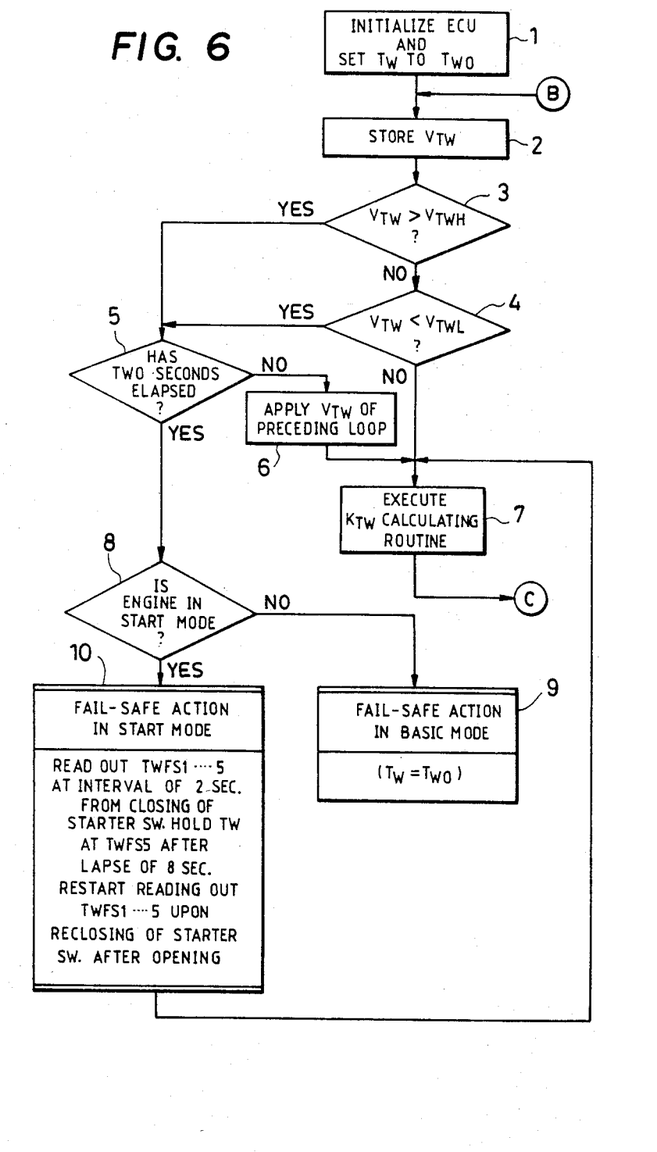
FIG. 6 is a flow chart showing the operating manner of the fuel supply control method according to the invention, applicable when an abnormality occurs in the engine temperature detecting means.

FIG. 6 shows a flow chart of the step 12 of the main program in FIG. 3 for detecting an abnormality in the engine cooling water temperature sensor 10 as well as for carrying out the start mode control and basic mode control when an abnormality occurs in the above cooling water temperature sensor 10.

When the ignition switch is turned on, the CPU is initialized, and at the same time a value TWO is set into a memory, which corresponds to a suitable predetermined cooling water temperature (e.g. 30° C.), at the step 1. Then, a data value VTW corresponding to actual cooling water temperature TW detected by the engine coiling water temperature sensor 10 is stored into a register (step 2). Next, it is determined whether or not the stored data value VTW is higher than a predetermined upper limit VTWH, at the step 3. If the answer to the question at the step 3 is no, the program proceeds to the step 4 to determine whether or not the data value VTW is lower than a predetermined lower limit VTWL. If the answer to the question in the step 4 is no (that is, VTWL<VTW<VTWH), it is judged that there is no abnormality in the functioning of the cooling water temperature sensor 10, and this value VTW is applied to the cooling water temperature-dependent fuel increasing correction coefficient calculating routine, at the step 7.

On the other hand, if the answer to either of the question in the step 3 and step 4 is yes, that is, if either of the relationships VTW>VTWH or VTW<VTWL stands, it is determined whether or not either one of the above relationships has continued to stand for a predetermined period of time (e.g. 2 seconds), at the step 5. If the answer to the above question is yes, it is judged that there is an abnormality in the cooling water temperature sensor 10. On the other hand, if the answer to the above question in the step 5 is no, it is judged that the CPU is still in the process of determining whether or not there is an abnormality in the cooling water temperature sensor 10. If it is determined that there is an abnormality in the cooling water temperature sensor 10, it is further determined whether or not the engine is operating in start mode (step 8). If the answer to the question in the step 8 is yes, data indicative of dummy temperature values TWFS1 . . . TWFS5 are read out from memories in a sequential manner at an interval of a predetermined period of time (e.g. 2 seconds), starting from the moment the starter switch 17 is turned on, as shown in (a) and (b) of FIG. 7, and after a predetermined period of time elapses (e.g. 8 seconds), the constant value indicative of the dummy temperature value TWFS5 is continuously read out. On the other hand, if the answer to the above question in the step 8 is no, it is judged that the engine is operating in post-starting basic mode, and the engine cooling water temperature is set to the aforesaid value TWO corresponding to the predetermined cooling water temperature (e.g. 30° C.). If the answer to the question in the step 5 is no, that is, if the CPU is in the process of determination of abnormality of the cooling water temperature sensor 10, the data value VTW applied to calculate the cooling water temperature-dependent coefficient in the previous loop is continued to be applied at the step 6. In this way, when it is determined that there is no abnormality in the cooling water temperature sensor 10, the data value VTW calculated in the present loop, and when the CPU is in the process of abnormality determination, the data value VTW of the previous loop are respectively applied to the cooling water temperature-dependent fuel increasing correction coefficient KTW calculating routine, while on the other hand, when it is determined that there is an abnormality in the cooling water temperature sensor 10, and at the same time if the engine is determined to be operating in start mode, the data corresponding to the dummy temperature values TWFS1-TWFS 5 obtained in the step 10, and when such abnormality is detected and if the engine is determined to be operating in a mode other than start mode, the data corresponding to the value TWO obtained in the step 9 are respectively applied to the same aforementioned routine for calculating the cooling water temperature-dependent fuel increasing correction coefficient KTW (step 7). Incidentally, in FIG. 6, symbols B and C correspond, respectively, to B and C of the subroutine shown in FIG. 3.

Figure 8:
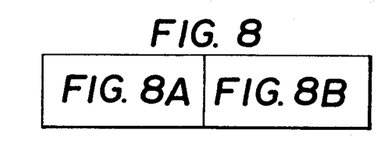
FIGS. 8, 8A, 8B are a circuit diagram illustrating an electrical circuit within the ECU in FIG. 1 that executes the method of the invention.
Figure 8A:
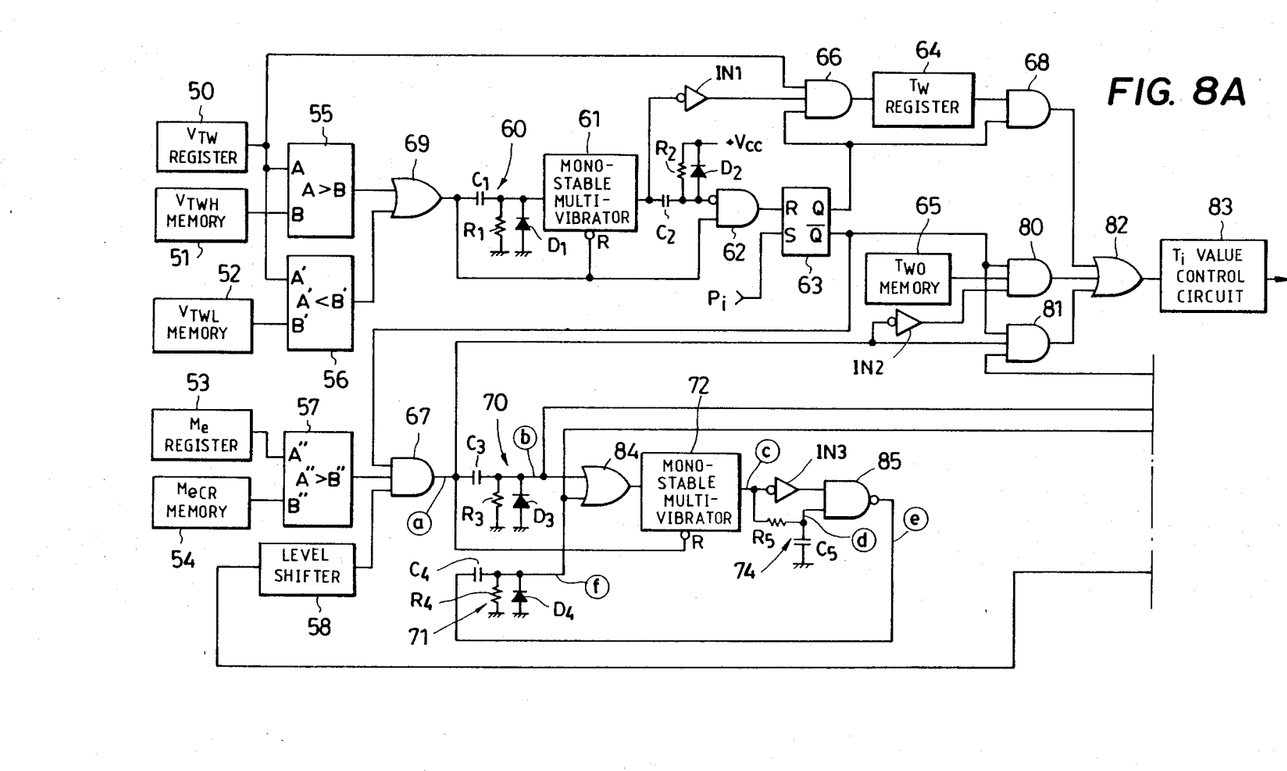
Figure 8B:
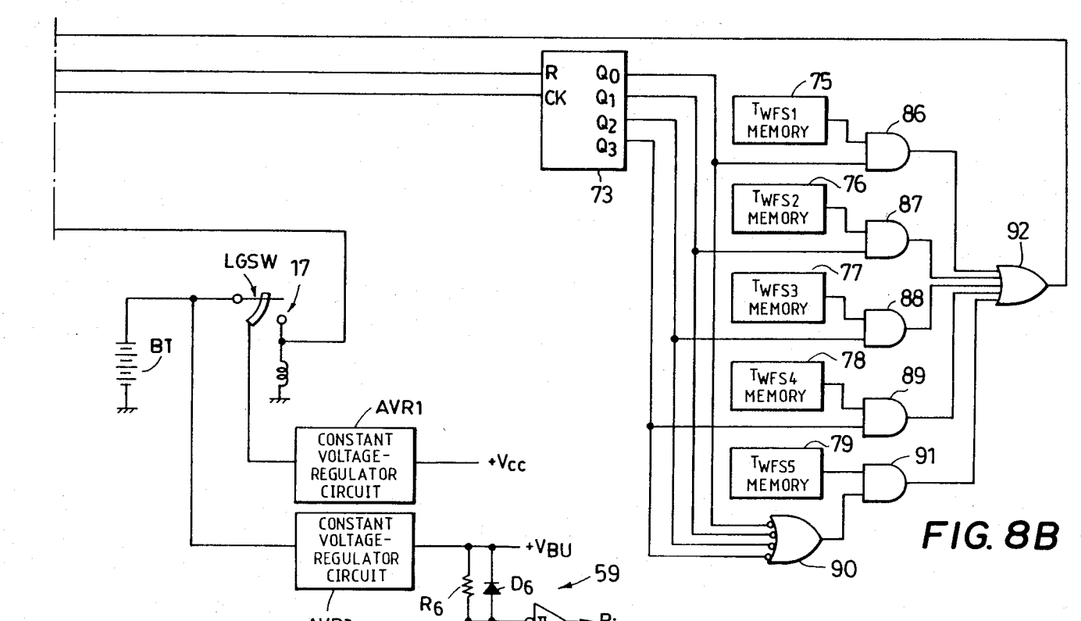

FIG. 8 shows a block diagram of control means arranged within the ECU 5 in FIG. 1, for determining an abnormality in the cooling water temperature sensor 10 as well as for reading dummy temperature data during the malfunctioning of the above cooling water temperature sensor 10, by the use of the routine shown in FIG. 6. By referring to FIG. 8, an engine cooling water temperature (TW) value register 50 is loaded with the data value VTW indicative of the output value of the engine cooling water temperature generated by the cooling water temperature sensor 10, at intervals of a predetermined period of time and applies them to one input terminal of an AND circuit 66 as well as to one input terminal A, A' of each of comparators 55 and 56. On the other hand, the comparators 55 and 56 have their other input terminals B and B' supplied, respectively, with the cooling water temperature upper limit value VTWH from a VTWH value memory 51 and the cooling water temperature lower limit value VTWL from a VTWL value memory 52. An engine rpm (Me) value register 53 is loaded with a value Me corresponding to a reciprocal 1/Ne of the engine rpm Ne outputted by the engine rpm sensor 11 in FIG. 1 and applies it to an input terminal A" of a comparator 57. The comparator 57 has its other input terminal B" supplied with a value MeCR corresponding to a reciprocal of the predetermined engine cranking rpm NeCR from a MeCR value memory 54.

When the ignition switch IGSW is turned on, a constant voltage-regulator circuit AVR1 generates a predetermined voltage +Vcc from a battery BT and applies it to the present control means. Also, an initial set pulse generator 59 generates a single pulse Pi only when the voltage output from another constant voltage-regulator circuit AVR2 which is directly connected to the battery BT is applied to it for the first time, that is, only when the battery BT is directly mounted onto the vehicle. The above single pulse Pi is applied to a flip flop 63, hereinafter explained, to set same. A level shifter 58 shifts the level of the battery voltage applied thereto when the starter switch 17 is turned on, to a predetermined level and applies it to an input terminal of an AND circuit 67.

The comparator 55 compares the input temperature data value VTW with its upper limit VTWH in order to determine whether or not the cooling water temperature value VTW is higher than its upper limit VTWH. When the input relationship VTW VTWH stands, that is, when the cooling water temperature value VTW exceeds its upper limit VTWH, the comparator generates a signal having a high level (hereinafter called 1). The comparator 56 compares the input data value VTW and its lower limit VTWL, and when the input relationship VTW<VTWL stands, that is, when the cooling water temperature value VTW is lower than its lower limit VTWL, the comparator 56 generates an output of 1. In this way, when either one of the comparators 55 or 56 generates an output of 1, that is, when the engine cooling water temperature data value VTW is outside a predetermined temperature range, it is judged that there is an abnormality in the cooling water temperature sensor 10. When the output signals from the comparators 55 and 56 are at a low level (hereinafter called 0), a monostable multivibrator 61, which is connected to the comparators 55, 56 through an OR circuit 69, generates an output of 0. This output of 0 from the monostable multivibrator 61 is inverted into a high level of 1 by an inverter IN1 and then applied to the AND circuit 66. On the other hand, the flip flop 63 which is in a set state by the initial set pulse Pi applied thereto as previously noted, generates an output of 1 at its output terminal Q, which is applied to the AND circuit 66 and an AND circuit 68, to energize them. In this way, when the cooling water temperature data value VTW is within the range defined by the upper limit VTWH and the lower limit VTWL (VTWL<VTW<VTWH), that is, when there is no abnormality in the cooling water temperature sensor 10, the outputs of comparators 55 and 56 become 0, so that the successively outputted temperature data value VTW from the VTW value register 50 is supplied to an engine cooling water temperature (TW) value register 64 through the AND circuit 66, whereby old data stored in the TW value register 64 is replaced by a newly inputted data value VTW, and the new data value VTW is then supplied from the register 64 to a valve opening period (Ti) value control circuit 83 through the AND circuit 68 and an OR circuit 82.

When the data value VTW from the VTW value register 50 becomes either higher than the upper limit VTWH or lower than the lower limit VTWL due to an abnormality in the cooling water temperature sensor 10, either one of the comparators 55 and 56 generates an output of 1 and this output of 1 is applied to each of a differentiator circuit 60 composed of a capacitor $C_1$, a resistor $R_1$ and a diode $D_1$, and one input terminal of an inhibit circuit 62, as well as to a reset pulse input terminal of the monostable multivibrator 61, all through the OR circuit 69. Responsive to the input, the differentiator circuit 60 generates a trigger pulse and applies it to the monostable multivibrator 61. The monostable multivibrator 61 is actuated by this trigger pulse to generate an output of 1 for a predetermined period of time (that is, 2 seconds as shown at the step 5 of FIG. 6). This output of 1 is inverted into a low level of 0 by the inverter IN1 and then applied to the AND circuit 66 to deenergize same. The monostable multivibrator 61 has its output also connected to the other input terminal of the inhibit circuit 62 through a capacitor $C_2$, which in turn has its input connected to a voltage supply +Vcc through a parallel circuit formed of a resistor $R_2$ and a diode $D_2$. This diode $D_2$ serves to regulate the voltage level inputted to the inhibit circuit 62 to a predetermined value lower than the supply voltage level +Vcc.

As the output of the monostable multivibrator 61 becomes a low level of 0 after the lapse of 2 seconds, referred to before, that is, as its output changes from a high level of 1 to a low level of 0, the capacitor $C_2$ is discharged, and until the capacitor $C_2$ is recharged after it is discharged, the input to the inhibit circuit 62 remains 0. On this occasion, if an output of 1 from the OR circuit 69 is applied to one input terminal of the inhibit circuit 62, that is, if the output of 1 from the OR circuit 69 continues beyond 2 seconds, the output of the inhibit circuit 62 goes high to reset the flip flop 63. In this circumstance, it is determined that there is an abnormality in the cooling water temperature sensor 10.

When the output generated by the OR circuit 69 changes from a high level of 1 to a low level of 0, the monostable multivibrator 61 is reset. In this way, when an output of 1 from the OR circuit 69 goes low before the lapse of 2 seconds, simultaneously, the output of the monostable multivibrator 61 becomes 0, to energize the AND circuit 66, whereby the cooling water temperature data value VTW from the VTW value register 50 is supplied to the TW value register 64 through the above AND circuit 66.

When the flip flop 63 is reset due to an abnormality in the output of the cooling water temperature sensor 10 in the above stated manner, it generates an output of 0 through its Q terminal to deenergize the AND circuits 67 and 68, while the output through its $\overline{Q}$ terminal becomes 1, to energize the AND circuit 67 as well as AND circuits 80 and 81. In this way, the data outputted by the VTW value register 50 is not transferred to the TW value register 64, thereby preventing the rewriting of this data into the TW value register 64. At the same time, no data value is outputted from the AND circuit 68 which otherwise outputs actual water temperature data values, when the cooling water temperature sensor 10 normally operates.

Figure 9:
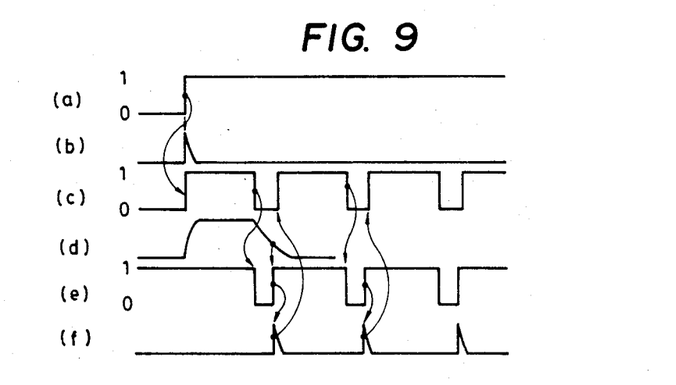
FIG. 9 is a timing chart showing changes in the signal levels at the points (a) to (f) in the circuit in FIGS. 8, 8A, 8B, in relation to the progress of time.

The comparator 57, which determines whether the engine is operating in start mode or in post-start basic mode, compares the value Me corresponding to the actual engine rpm Ne supplied from the Me value register 53 with the predetermined value MeCR corresponding to the cranking rpm NeCR supplied from the MeCR value memory 54, and when the input relationship Me>MeCR (A''>B'') stands, that is, consequent upon determining that the engine is operating in start mode, the comparator 57 generates an output of 1 and applies it to a differentiator circuit 70 formed by a capacitor $C_3$, a resistor R$_3$, and a diode D$_3$, a reset pulse input terminal of a monostable multivibrator 72, the AND circuit 81, and the AND circuit 80 by way of an inverter IN2, all through the AND circuit 67, which is energized when the starter switch 17 is on. As shown in FIG. 9, when an output of 1 from the AND circuit 67, as shown in (a) of FIG. 9, is applied to the differentiator circuit 70, the differentiator circuit 70 generates a trigger pulse upon rising of the above output signal from the AND circuit 67, as in (b) of the same figure, and applies it to a reset pulse input terminal R of a counter and decoder 73 to reset same, and at the same time, applies the same trigger pulse to the monostable multivibrator 72 through an OR circuit 84.

When the trigger pulse is applied to the monostable multivibrator 72, the output of the above multivibrator 72 becomes a high level of 1 for a constant period of time, as shown in (c) of FIG. 9. This output of 1 is applied to an integration circuit 74 formed by a resistor R$_5$ and a capacitor C$_5$, directly, and to one input terminal of a NAND circuit 85 through an inverter IN3. The output of the integration circuit 74 is in turn applied to the other input terminal of the NAND circuit 85. The output of the integrator circuit 74 varies in a manner illustrated in (d) of FIG. 9 so that the output of the NAND circuit 85 becomes 1 when the output of the monostable multivibrator 72 is 1 and becomes 0 when the output of the same multivibrator 72 is 0, as shown in (e) of FIG. 9. These outputs of the NAND circuit 85 are applied to a differentiator circuit 71 formed by a capacitor C$_4$, a resistor R$_4$ and a diode D$_4$.

As the output of the NAND circuit 85 changes from 0 to 1, the differentiator circuit 71 generates a trigger pulse as illustrated in (f) of FIG. 9 and applies it to a clock pulse input terminal CK of the counter and decoder 73 directly as well as to the monostable multivibrator 72 through the OR circuit 84. Consequently, once the monostable multivibrator 72 is actuated by the trigger pulse from the differentiator circuit 70, an oscillator circuit is formed by the above monostable multivibrator 72, the inverter IN3 and the integration circuit 74, the NAND circuit 85, the differentiator circuit 71 and the OR circuit 84 so as to generate successive trigger pulses through the differentiator circuit 71 in synchronism with the generation of output signals from the monostable multivibrator 72, as illustrated in (f) of FIG. 9. The pulse repetition period of the trigger pulse signal from the differentiator circuit 71 is set to 2 seconds as shown at the step 10 of FIG. 6.

When the counter and decoder 73 is reset, the output through its output terminal Q0 alone goes high, while the outputs through its other output terminals Q1 to Q3 remain 0. However, every time a trigger pulse is applied to its clock pulse input terminal CK, the output through either one of its output terminals Q0 to Q3 goes high so that high outputs are successively generated through different ones of these output terminals.

Figure 7:
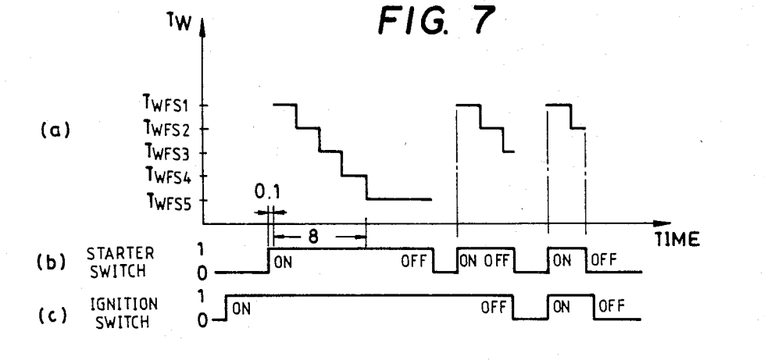
FIG. 7 is a timing chart showing changes in the value of a dummy signal indicative of engine temperature in relation to the progress of time.

These outputs through the output terminals Q0 to Q3 of the counter and decoder 73 are applied, respectively, to one input terminals of AND circuits 86 to 89, thereby successively energizing these AND circuits 86 to 89. These AND circuits 86 to 89 have their other input terminals connected, respectively, to TWFS value memories 75 to 78, wherein TWFS data indicative of the dummy temperature values TWFS1 to TWFS4 (TWFS1>TWFS2>TWFS3>TWFS4), as shown at the step 10 in FIG. 6 and in (a) of FIG. 7, are stored. Also, the output terminals Q0 to Q3 of the counter and decoder 73 are connected to one input terminal of an AND circuit 91 through a NAND circuit 90, while the AND circuit 91 has its other input terminal connected to a TWFS value memory 79, wherein the TWFS data indicative of the dummy temperature value TWFS5 (<TWFS4) is stored.

From the moment the starter switch 17 is turned on, as shown in (b) of FIG. 7, data indicative of the dummy temperature values TWFS1 to TWFS4 from the TWFS1 to TWFS4 value memories are successively generated at an interval of 2 seconds, as illustrated in (a) of FIG. 7, through the AND circuits 86 to 89. Upon the lapse of 8 seconds, the NAND circuit 90 generates an output of 1 to energize the AND circuit 91 so as to transfer a data value indicative of the dummy temperature value TWFS5 through it. These data are applied to the Ti value control circuit 83 through an OR circuit 92, the AND circuit 81 and the OR circuit 82.

Incidentally, if the starter switch 17 is turned off when the engine is operating in start mode, as shown in (b) of FIG. 7, the output of the AND circuit 67 becomes 0, to reset the monostable multivibrator 72. On this occasion, even though a TWFS data value corresponding to either one of the output signals through the output terminals Q0 to Q3 of the counter and decoder 73 is generated through the OR circuit 92, the above data value is not passed on to the Ti value control circuit 83, as the AND circuit 81 is then deenergized. When the starter switch 17 is turned on again, the output of the AND circuit 67 is restored to a high level of 1, to reset the counter and decoder 73, thereby resuming the outputting of successive signals of 1 through its output terminals Q0 to Q1, Q2 . . . etc., and depending upon these signals, the dummy signal data TWFS1, TWFS2 . . . etc. are successively applied to the Ti value control circuit 83, in the same way as explained before. As explained hereabove, the data generated by the AND circuit 81 are data corresponding to the dummy signal data TWFS1 to TWFS4 indicative of dummy temperature values applied when there is an abnormality in the cooling water temperature sensor 10 and at the same time, while the engine is operating in start mode.

When the output of the comparator 57 is 0, that is, when it is determined that the engine is operating in post-starting condition, the output of the AND circuit 67 becomes 0, causing deactivation of the monostable multivibrator 72 and the counter and decoder 73. On the other hand, the output through the inverter IN2 becomes a high level of 1, to energize the AND circuit 80, thereby allowing a data value indicative of dummy temperature TW0 stored in a TW0 value memory 65 to be applied to the Ti value control circuit 83 through the AND circuit 80, and the OR circuit 82.

That is, the AND circuit 80 generates the data value indicative of the dummy value TW0 when there is an abnormality in the cooling water temperature sensor 10, and at the same time, the engine is operating in a mode other than the start mode.

The Ti value control circuit 83 calculates the valve opening period Ti value by the use of data corresponding to the temperature values inputted through the OR circuit 82 and then generates a control signal corresponding to the above calculated valve opening period value and applies it to the fuel injection valve 6 shown in FIG. 1. That is, when there is an abnormality in the cooling water temperature sensor 10, the fuel supply to the engine is gradually increased at the start of the engine, whereas the quantity of fuel supplied to the engine is maintained at a predetermined quantity in an operating condition of the engine other than the start of the engine, e.g. post-starting operating condition or normal engine operation.

What is claimed is:

1. A method for electronically controlling the quantity of fuel supply to an internal combustion engine including detecting a temperature of the engine, detecting an abnormality in an engine temperature detecting signal, employing a dummy signal indicative of engine temperature in place of said temperature detecting signal when said abnormality is detected, and increasing the quantity of fuel being supplied to the engine with the lapse of time by the use of dummy signal.

2. A method as claimed in claim 1, comprising determining than an abnormality occurs in said engine temperature detecting when the value of said signal remains outside a predetermined range for a predetermined period of time.

3. A method as claimed in either claim 1 or 2, wherein the value of said dummy signal successively changes from a higher temperature value to lower temperature values at predetermined time intervals.

4. A method as claimed in claim 3 wherein said dummy signal changes successively in a stepwise manner from a higher temperature to lower temperatures at predetermined time intervals.

5. Apparatus for electronically controlling the quantity of fuel supply to an internal combustion engine having means for detecting a temperature of the engine and producing a temperature signal, comprising means for detecting an abnormality in the functioning of said engine temperature detecting means, means for employing a dummy signal indicative of engine temperature in place of said temperature signal when said abnormality is detected, and means for increasing the quantity of fuel being supplied to the engine with the lapse of time by the use of the value of said predetermined dummy signal.

6. Apparatus as claimed in claim 5, comprising means for determining that an abnormality occurs in said engine temperature detecting means when the value of said signal remains outside a predetermined range for a predetermined period of time.

7. Apparatus as claimed in either claim 5 or 6, wherein the value of said dummy signal successively changes from a higher temperature value to lower temperature values at predetermined time intervals.

8. Apparatus as claimed in claim 7, wherein said dummy signal successively changes in a stepwise manner from a higher temperature to lower temperatures at predetermined time intervals.

9. A method for electronically controlling the quantity of fuel being supplied to an internal combustion engine having a starter and a means for detecting a temperature of the engine, at the start of the engine in response to values of engine control parameters including at least the temperature of the engine detected by said engine temperature detecting means, the method comprising the steps of: (a) detecting an abnormality in the functioning of said engine temperature detecting means; (b) employing a predetermined dummy signal indicative of engine temperature in place of a signal outputted by said engine temperature detecting means, for control of the quantity of fuel being supplied to the engine, when an abnormality is detected in the functioning of said engine temperature detecting means; and (c) gradually increasing the quantity of fuel being supplied to the engine with the lapse of time starting from a time said starter is switched on, by the use of the value of said predetermined dummy signal when an abnormality is detected in the functioning of said engine temperature detecting means while the engine is operating in a predetermined starting condition.

10. A method as claimed in claim 9, wherein said step (a) comprises determining that an abnormality occurs in the functioning of said engine temperature detecting means when the value of said signal outputted by said engine temperature detecting means continues to remain outside a predetermined range for a predetermined period of time.

11. A method as claimed in claim 9, wherein said predetermined starting condition of the engine is an operating condition where the rotational speed of the engine is lower than a predetermined cranking speed and at the same time said starter is in an on-state.

12. A method as claimed in claim 9, wherein said engine temperature comprises the temperature of engine coolant.

13. A method as claimed in claim 9, wherein in said step (c), the value of said predetermined dummy signal is set so as to successively change from a higher temperature value to lower temperature values at an interval of a predetermined period of time.

14. A method as claimed in claim 13, wherein the value of said predetermined dummy signal is set so as to successively change in a stepwise manner from a higher temperature to lower temperatures at an interval of a predetermined period of time.

15. A method as claimed in claim 9, claim 3 or claim 4, further including the step of maintaining the value of said predetermined dummy signal at a predetermined value after said predetermined starting condition has been completed.

* * * * *

UNITED STATES PATENT AND TRADEMARK OFFICE
CERTIFICATE OF CORRECTION

PATENT NO. : 4,531,495
DATED : July 30, 1985
INVENTOR(S) : Akihiro Yamato; Yutaka Otobe It is certified that error appears in the above-identified patent and that said Letters Patent is hereby corrected as shown below:

In claim 2, column 13, line 16 please delete "than" and insert --that--;

In claim 15, column 14, line 48, delete "3" and insert --13--; in line 49, delete "4" and insert --14--.

Signed and Sealed this

Eighth Day of April 1986

[SEAL]

Attest:

DONALD J. QUIGG

Attesting Officer

Commissioner of Patents and Trademarks